United States Patent [19]

Williams

[11] 3,982,601

[45] Sept. 28, 1976

[54] GUIDE SUPPORT FOR SLIDABLE DOOR OF GRADER HAVING AN ARTICULATED FRAME

[75] Inventor: Lary Lynn Williams, Dubuque, Iowa

[73] Assignee: Deere & Company, Moline, Ill.

[22] Filed: May 1, 1975

[21] Appl. No.: 573,674

[52] U.S. Cl. .............................. 180/89 R; 180/134; 180/51; 296/28 C; 296/155
[51] Int. Cl.² .......................................... B60J 5/06
[58] Field of Search ................. 180/89, 51, 52, 134; 296/28 C, 155, 146, 151; 280/423, 442

[56] References Cited
UNITED STATES PATENTS

| | | | |
|---|---|---|---|
| 2,955,872 | 10/1960 | Barenyi | 296/155 |
| 3,007,590 | 11/1961 | Mathew | 180/51 |
| 3,101,806 | 8/1963 | Salna | 180/52 |
| 3,360,295 | 12/1967 | Reynolds | 296/28 C |
| 3,384,196 | 5/1968 | Fielding | 180/79.2 B |

FOREIGN PATENTS OR APPLICATIONS

| | | | |
|---|---|---|---|
| 2,119,209 | 11/1971 | Germany | 296/155 |
| 2,025,406 | 12/1971 | Germany | 296/155 |

*Primary Examiner*—M. H. Wood, Jr.
*Assistant Examiner*—John P. Silverstrim

[57] ABSTRACT

A motor grader includes front and rear frame sections connected together for relative pivotal movement about a vertical axis located between a cab mounted on the front frame section and an engine enclosure mounted on the rear frame section. The cab is provided at its opposite sides with fore-and-aft slidable doors supported for movement to respective open positions wherein they are disposed in outwardly angled relationship to the cab and extend rearwardly beyond the cab. The angled disposition of the doors is such that when the front frame section is in a fully angled position in the direction of one of the doors the rear end of the latter will be located between the engine enclosure and front wheel of one of a pair of bogie wheel assemblies supporting the rear frame section.

8 Claims, 7 Drawing Figures

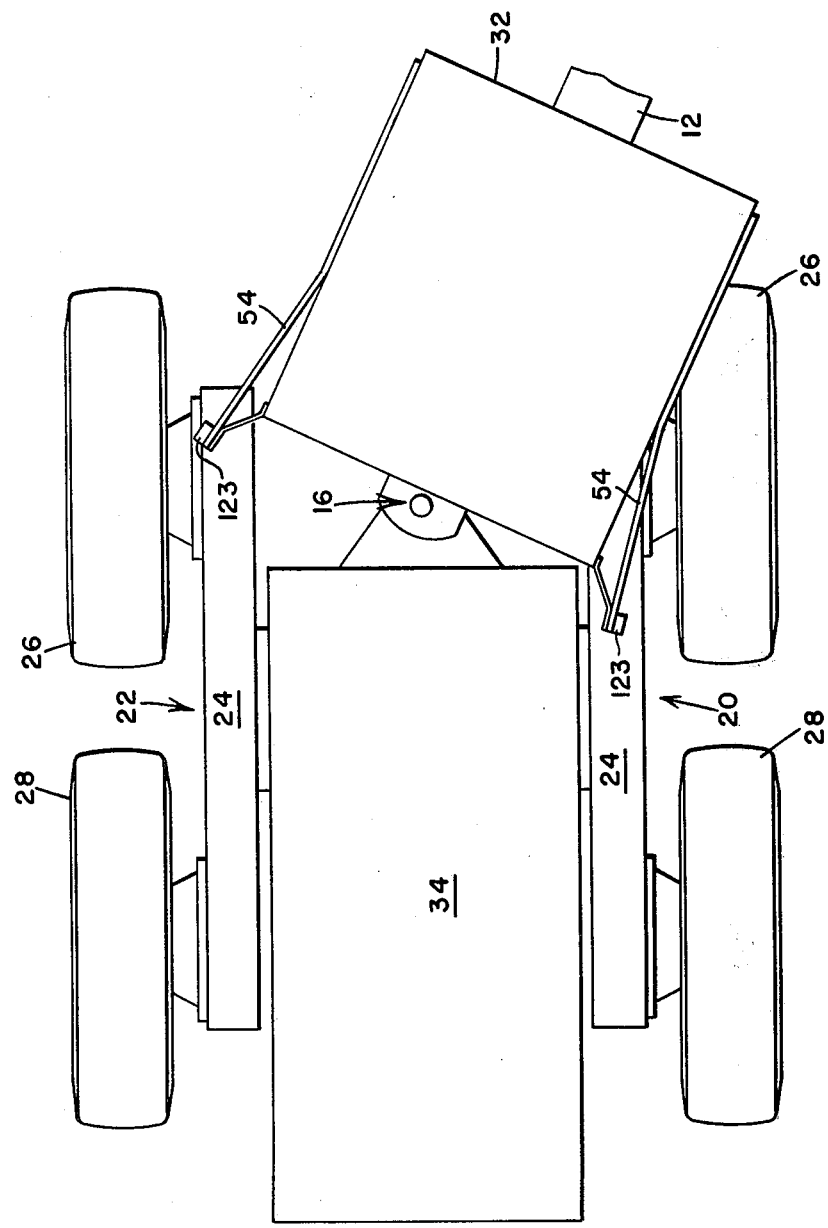

GUIDE SUPPORT FOR SLIDABLE DOOR OF GRADER HAVING AN ARTICULATED FRAME

BACKGROUND OF THE INVENTION

The present invention relates to a slidable door for a motor grader cab and more specifically relates to a support for such a door used on a grader having front and rear frame sections connected together for relative movement about a vertical pivot axis located between a cab and an engine enclosure respectively mounted on the front and rear frame sections.

Motor graders having an articulated main frame of the type described in the preceding paragraph have heretofore been provided with cabs including hinged doors at their opposite sides which are mounted high enough to swing over the forward wheels of tandem wheels provided at the opposite sides of the rear frame section for supporting the latter. The floors of these cabs are located a considerable amount above the levels of the tops of the tandem wheels thus leaving relatively high door sills extending from the floors to the bottoms of the door openings. These high sills have the disadvantages that they must be stepped over by an operator leaving the cab and they result in the lower edges of transparent panels provided in the doors being higher than is desirable for best operator visibility of opposite ends of the blades of the graders.

Also, the cabs of some motor graders are constructed such that the operator's vision toward working areas at the opposite sides of the grader are obscured by front upright posts of the frames of the cabs.

Further, operators are often positioned relatively close to the front walls of some cabs thus requiring a large degree of eye movement for the operators to change from looking at a working area just forwardly of the cab to an area in the vicinity of the front wheels of the grader.

SUMMARY OF THE INVENTION

According to the present invention there is provided a novel cab structure for a motor grader and more specifically there is provided a novel guide support for a slidable door for a cab to be used on a motor grader having an articulated main frame and wherein the cab is mounted just forwardly of the frame pivot axis and an engine enclosure is mounted just rearwardly of the pivot axis.

An object of the invention is to provide a slidable door mounted such that it moves to an open position wherein a rear part thereof is located rearwardly of the cab such that it will not interfere with the engine enclosure during articulation of the grader frame.

A more specific object is to provide a slidable door support for guiding the rear end of the door from a closed position embracing framework bordering the rear part of the door opening along a path angled rearwardly and outwardly from the last mentioned framework.

Still a more specific object is to provide a mounting for a slidable door including an upper guide track extending above the door opening and a lower guide track extending rearwardly from a central location between the top and bottom of the door opening.

Another specific object is to provide guide tracks constructed so as to prevent rollers of the door from becoming disengaged from a rail surface of the track through upward movement of the door.

Yet another specific object is to provide first and second guide roller brackets respectively hingedly mounted on the upper front and central rear parts of the door so as to accomodate outward and inward movement of the rear end of the door relative to the front end respectively, during opening and closing of the door.

Another object is to provide a guide means for maintaining the lower end of the door inward during opening and closing of the door.

A further object is to provide a releasable latch for automatically securing the door in its open position.

Another object of the invention is to provide a cab having a door mounted such that the door sill extends only a relatively short distance above the cab floor.

These and other objects will become apparent from a reading of the following description in conjunction with the appended drawings.

BRIEF DESCRIPTION OF THE DRAWINGS

FIG. 3 is an enlarged view of the door stop taken along the line 3—3 in FIG. 1.

FIG. 7 is a schematic top plan view of the motor grader showing the relationship between the rearwardly and outwardly angled guide track and the engine enclosure when the front frame section is in a fully angled position relative to the rear frame section.

DESCRIPTION OF THE PREFERRED EMBODIMENT

Figure 1:
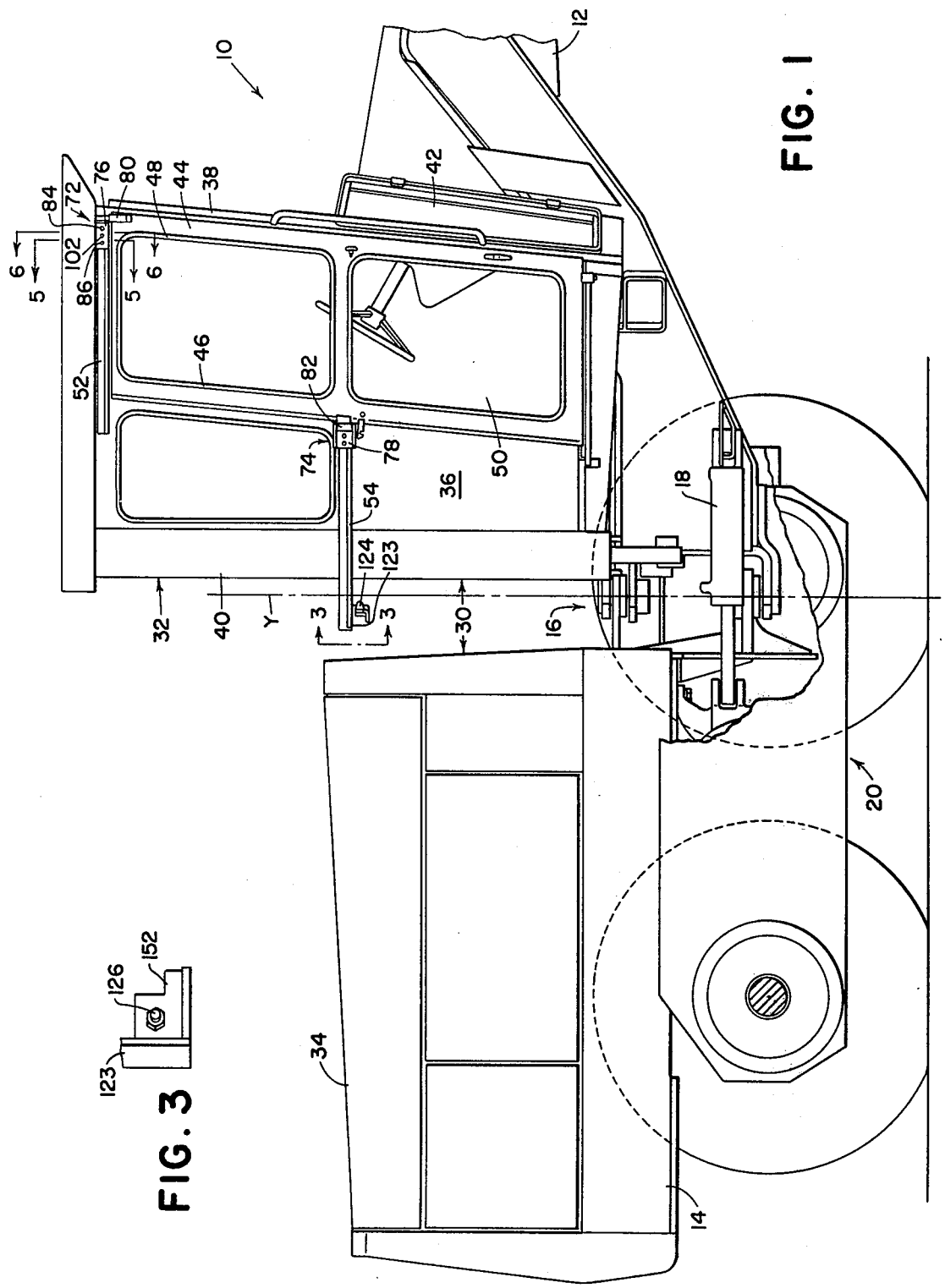
FIG. 1 is a right side elevational view of the rear part of a motor grader embodying a slidable door supported according to the principles of the present invention with parts being broken away to expose the vertical pivot assembly joining the front and rear frame sections of the grader.

Referring now to FIG. 1 of the drawings, therein is shown a motor grader indicated in its entirety by the reference numeral 10. The motor grader 10 includes an articulated main frame comprising a front frame section 12 and a rear frame section 14 connected together by means of a pivot assembly 16 defining a vertical pivot axis Y about which the frame sections 12 and 14 are pivotal relative to each other. A pair of steering actuators, only one being shown at 18, are connected between the frame sections 12 and 14 for effecting frame-steering in a manner well known in the art. The front end (not shown) of the front frame section 12 is supported, in a conventional manner, on a pair of ground wheels and the rear frame section 14 is supported by right and left bogie wheel assemblies 20 and 22. The bogie wheel assemblies 20 and 22 each include a fore-and-aft extending beam 24 pivoted intermediate its ends to the rear frame 14 and having front and rear wheels 26 and 28 respectively, attached thereto. It is here to be noted that the front wheels 26 are located so as to be partly forward of the vertical axis Y.

Respectively mounted on the front and rear frame sections 12 and 14 forwardly and rearwardly of the vertical axis Y to thus establish a longitudinal gap 30 extending over the axis Y are a cab 32 and an engine enclosure 34.

It is to be here noted that only the details of a right side 36 of the cab are illustrated and it is to be understood that the left side of the cab 32 is a mirror image of the right side 36. The right side 36 of the cab 32 includes front and rear upright corner structures 38 and 40, respectively. A lower front transparent panel 42 is curved forwardly and inwardly from the front corner structure 38 to the front frame section 12 so as to provide means through which a seated operator may view, with only a small amount of distortion, working areas to the right of the frame section 12.

Located rearwardly of the front corner structure 38 is a door opening which is closed by a door 44 including a frame 46 supporting upper and lower transparent windows 48 and 50, respectively. The door 44 is mounted for sliding rearwardly to an open position relative to the door opening by means of structure including similarly shaped upper and lower horizontal guide tracks 52 and 54, respectively. When the door 44 is closed, as illustrated in FIG. 1, the track 52 extends fore-and-aft above the door 44 and has a rear portion extending rearwardly therebeyond; and the track 54 extends rearwardly from the door 44, at a location approximately midway between upper and lower edges of the door 44, and is inclined outwardly from front to rear relative to the side 36 of the cab 32 and has a rear end portion located rearwardly of the cab 32.

The guide tracks 52 and 54 are respectively constructed of outwardly opening channel-like members respectively including upper horizontal legs 56 and 58 and lower horizontal legs 60 and 62. Respectively forming continuations of the legs 60 and 62 are vertical flanges 64 and 66 respectively having upper horizontal edges 68 and 70 located directly below the legs 56 and 58.

Figure 5:
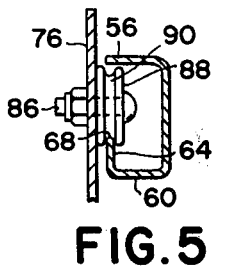
FIG. 5 is an enlarged sectional view of the upper roller and guide assembly taken along the line 5—5 in FIG. 1.
Figure 6:
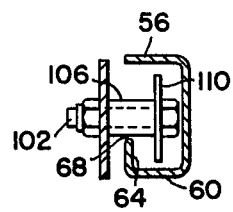
FIG. 6 is an enlarged sectional view similar to FIG. 2 but taken along the line 6—6 of FIG. 1.

The door 44 is respectively supported for guided movement along the guide tracks 52 and 54 by similar roller assemblies 72 and 74 respectively connected to the door 44 at upper forward corner and central rear locations thereof. The roller assemblies 72 and 74 respectively include brackets 76 and 78 respectively hingedly connected to the door 44 as at 80 and 82 for pivotal movement about respective upright axes. Fixed to the bracket 76 are a pair of fore-and-aft spaced, horizontal transverse pins 84 and 86 respectively on which a pair of rollers 88 (only one shown in FIG. 5) are rotatably mounted. The rollers 88 each include an annular radially open groove 90 received on the edge 68 of the flange 64 of the guide track 52. Each roller 88 is dimensioned such that the horizontal leg 56 of the guide track prevents the groove 90 from becoming disengaged from the flange 64 in the event that the door 44 is forced upwardly.

Figure 2:
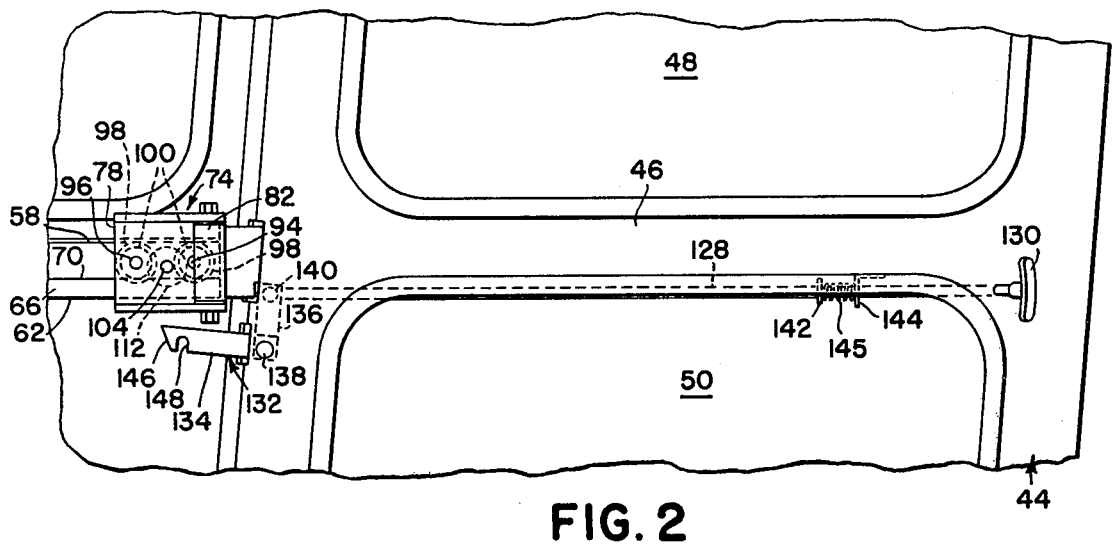
FIG. 2 is an enlarged view of the latch mechanism shown in FIG. 1 for latching the door in its rearward open position.

The bracket 78 (FIG. 2) has a pair of horizontal transverse pins 94 and 96 fixed thereto and respectively rotatably mounted on the pins 94 and 96 are rollers 98. Each of the rollers 98 is provided with an annular groove 100 received on the edge 70 of the flange 66 of the guide track 54. The rollers 98 are dimensioned such that the horizontal leg 58 of the guide track 54 prevents the rollers 98 from becoming disengaged from the flange 66 in the event that the door 44 is forced upwardly.

As a safety precaution for preventing the door 44 from dropping in the event that the pairs of rollers 88 and 98 somehow become disengaged from the guide tracks 52 and 54, pins 102 and 104 are respectively fixed to the brackets 76 and 78 at respective locations between and slightly below the levels of the pair of pins 84 and 86 and the pair of pins 94 and 96. Respectively mounted on the pins 102 and 104 so as to be spaced from the edges 68 and 70 are spacers, only the spacer 106 of the assembly 72 being shown, and respectively disposed adjacent the spacers are discs 110 and 112, which are respectively spaced above the lower horizontal legs 60 and 62. The discs 110 and 112 are dimensioned so that their diameters are larger than the space between the upper horizontal legs 56 and 58 and the edges 68 and 70 of the flanges 64 and 66.

Figure 4:
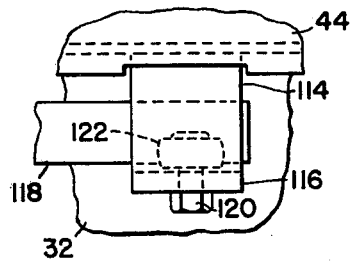
FIG. 4 is an enlarged view of the abutment assembly shown in FIG. 1 for keeping the bottom of the door properly disposed.

The bottom of the door is held in during its movement along the guide tracks 52 and 54 through means of an abutment assembly comprising an L-shaped bracket 114 (FIGS. 1 and 4) fixed to a lower front corner location of the door 44 and having an inwardly projecting horizontal leg 116 extending below a fore-and-aft extending vertical flange 118 of the cab 32. A vertical pin 120 is mounted in the leg 116 and rotatably mounted on the latter is a roller 122 which is engaged with an inner surface of the flange 118.

Fixed to the rear end of the guide track 54 is a depending bracket 123 (FIGS. 1 and 3) having a resilient bumper 124 secured thereto through means of a bolt 126, the bumper 124 being in a location for engaging the door 44 when it is moved rearwardly to a fully open position.

For maintaining the door in its fully open position, the door 44 is provided centrally between the top and bottom thereof with a latch mechanism (FIG. 2) including a fore-and-aft extending actuator rod 128 reciprocably mounted in the door 44 and having a handle 130 fixed to its forward end. An L-shaped latch member 132 is arranged, as viewed in FIG. 2, such that first and second legs 134 and 136 thereof respectively extend generally horizontally and vertically from a pivot mounting 138 defining a horizontal transverse pivot axis about which the latch member 132 is swingable. The upper end of the first leg 134 of the latch member 132 is pivotally connected, as at 140, to the rear end of the rod 128 and acting between a disc 142 fixed to the rod 128 and a bracket 144 fixed to the door 44 is a coil compression spring 145 which biases the latch member 132 towards its position shown in FIG. 2 wherein the leg 136 is generally horizontal. The leg 136 has an upwardly and rearwardly inclined cam surface 146 at its rear end and has a latch receptacle 148 in the underside thereof.

The bracket 123 at the rear of the guide track 54 is provided with a latch portion 152 disposed for engagement by the cam surface 146 of the latch member 132 as the door 44 approaches its fully open position. The contact of the cam surface 146 with the latch portion 152 causes the latch member 132 to be forced upwardly to slide along the top of the portion 152 until the latter moves into the latch receptacle 148.

Referring now to the schematic illustration of FIG. 7, therein is shown the grader 10 with the front frame section 12 thereof in a fully rightward angled position relative to the rear frame section 14. It can be seen that the guide track 54 is angled away from the right side 36 of the cab 32 such that it is clear of and alongside the forward portion of the engine enclosure 34 and inwardly of the front wheel 26 of the right bogie wheel assembly 20.

The operation of the mounting means for the door 44 is briefly as follows. With the door 44 in its closed position shown in FIG. 1, the rear end of the door 44 will tightly engage the cab side 36 in overlapping relationship while the forward end of the door is tightly engaged with the corner structure 38. The weight of the door 44 will be shared between the guide tracks 52 and 54 respectively through means of the roller assembly 72 at the upper front corner of the door 44 and the roller assembly 74 at the central rear portion of the door 44.

If it is then desired to open the door 44 so as to permit an operator to enter or leave the cab 32, the door 44 is forced rearwardly to cause the rollers 88 to begin rolling along the edge 68 of the flange 64 and the rollers 98 to begin rolling along the edge 70 of the flange 66. As the door 44 moves rearwardly, the rear end thereof will move outwardly from the cab side 36 as dictated by the guide track 54 and as permitted by the hinge connections 80 and 82 of the brackets 76 and 78. As the door 44 approaches its fully open position, the latch member 132 will engage the latch portion 152 of the bracket 123 and will be caused to swing vertically by the action of the cam surface 146 so as to slide over the latch portion 152 until the latter moves into the latch receptacle 148 to hold the door in its fully open position.

The door 44 will then extend rearwardly beyond the cab 32 and when the front section 12 of the grader 10 is steered such that it is fully angled rightwardly relative to the rear frame section 14, a rear end portion of the door 44 will extend alongside a forward portion of the engine enclosure 34.

To move the door 44 back to its closed position, it is necessary only for the operator to grasp the handle 130 of the actuator rod 128 and pull forwardly thereon. This will move the rod 128 against the action of the spring 145 and will cause the latch member 132 to be swung upwardly to become disengaged from the latch portion 152 of the bracket 123.

During sliding movement of the door 44, the lower end will be maintained inwardly by the engagement of the roller 120 with the flange 118.

If the door 44 is forced upwardly, the rollers 88 and 98 will respectively engage the horizontal legs 56 and 58 of the guide tracks 52 and 54 before the door has moved far enough to disengage the rollers from the guide tracks.

In the event that the rollers 88 and 98 of the door 44 do somehow become disengaged from the tracks 52 and 54, the spacer 106 and the corresponding spacer of the assembly 74 and the discs 110 and 112 will engage the tracks so as to prevent the door 44 from falling.

I claim:

1. In a motor grader including front and rear frame sections respectively supported on front and rear wheel means and connected together for relative articulation about a vertical axis, steering means connected between the front and rear frame sections for moving the front frame section between right and left fully angled positions respectively located equidistant from a central position wherein the front frame section is longitudinally aligned with the rear frame section, a cab and an engine enclosure respectively mounted on the front and rear frame sections adjacent the vertical axis, the cab including a door opening, and a door, the improvement comprising: a framework for slidably mounting said door on said cab, for movement between open and closed positions relative to said door opening, said framework including a substantially horizontal guide track means including a first guide track located above the door opening and extending rearwardly a slight distance therebeyond and a second guide track located approximately midway between upper and lower bounds of and rearwardly of the door opening; track follower means supporting said door on said first and second tracks for movement between a forward closed position and a rearward open position; and said second guide track including a rearward projection so disposed relative to the engine enclosure and said vertical pivot that when the front frame section is fully angled in the direction of said one side of the cab the projection will extend alongside a forward end portion of the engine enclosure.

2. The grader defined in claim 1 wherein said track follower means includes first and second brackets respectively fixed to the door at upper front and middle rear locations; first and second rollers respectively mounted on the first and second brackets for rotation about respective horizontal transverse axes; said first and second rollers respectively including first and second annular radially opening grooves; and the first and second guide tracks respectively including first and second upper horizontal edges respectively engaged in the first and second grooves and first and second horizontal walls respectively located above the first and second edges a distance chosen such that the first and second rollers will come into contact therewith prior to becoming disengaged from the horizontal edges upon the door being forced upwardly.

3. The motor grader defined in claim 1 wherein said guide track means further includes a downwardly extending flange located on the cab below the door opening and the door having a roller fixed thereto for rotation about a vertical axis and disposed against an inner surface of the flange.

4. The motor grader defined in claim 1 wherein the rear wheel means includes ground engaging wheels located on opposite sides of the cab and having tops located at a level below a sill of the door opening; and said guide track means being located so as to guide the door along a path extending between an inner surface of that wheel located adjacent said one side of the cab and the cab.

5. The grader defined in claim 1 and further including latch means for latching the door in its open position; said latch means including a latch arm means mounted on the rear of the door at a location approximately midway between upper and lower bounds of the door; a latch bar fixed to the rear end of the second guide track so as to be in a path of movement traced by the latch arm means upon opening the door; said latch arm means including a receptacle means and being mounted for moving the receptacle means to a latched position in capturing relationship to the latch bar.

6. The grader defined in claim 5 wherein said latch arm means is vertically pivotally mounted on the door and said receptacle opens downwardly; biasing means urging said latch arm means to its latched position; and said latch arm means including cam surface means disposed to engage the latch bar and pivot the latch arm means for movement against the biasing means and over the latch bar so as to permit the latter to enter said receptacle.

7. In a motor grader including front and rear frame sections respectively supported on front and rear wheel means and connected together for relative articulation about a vertical axis; steering means connected between the front and rear frame sections for moving the front frame section between right and left fully angled positions respectively located equidistant from a central position wherein the front and rear sections are longitudinally aligned with each other, a cab and an engine enclosure respectively mounted on the front and rear frame sections at respective locations choosen such that a gap exists between the cab and engine in the vicinity of the vertical axis, one side of said cab including a door opening and a door, the improvement comprising: a framework for slidably mounting said door on said cab, for movement between opened and closed positions relative to said door opening, said framework including a horizontal guide track means including a portion located approximately midway between upper and lower bounds of and rearwardly of the door opening; said portion being angled outwardly from and extending rearwardly beyond the remainder of the cab; track follower means supporting the door on said guide track means for sliding movement between a forward closed position and a rearward open position; and the portion of the guide track means located rearwardly of the door opening including a rear end which is located alongside the engine enclosure when the front frame section is fully angled in the direction of the one side of the cab.

8. In a motor grader including a wheel-supported front frame section connected to a wheel-supported rear frame section for pivotal movement relative thereto about a vertical axis between first and second fully angled positions respectively located equidistant from a center position wherein the front and rear frame sections are in fore-and-aft alignment with each other; power means connected between the first and second frame sections for moving the front frame section between its fully angled position, a cab and an engine enclosure respectively mounted on the front and rear frame sections in spaced relationship to each other so as to define a longitudinal gap located therebetween and over the vertical axis, at least one side of said cab including a door opening, and a door, the improvement comprising: a first generally fore-and-aft extending horizontal guide means fixed above the door opening; a second generally fore-and-aft extending horizontal guide means fixed approximately midway between upper and lower bounds of and rearwardly of the door opening and projecting rearwardly beyond the remainder of the cab; first and second guide follower means respectively engaged with the first and second guide means and fixed to the door for supporting the door on the guide means for movement therealong between a forward closed position and a rearward open position; and said second guide means being oriented such that, when the door is in its rearward open position, a rearward portion of the door extends alongside a forward portion of the engine enclosure when the front frame section is in one of its fully angled positions.

* * * * *